(12) United States Patent
Komatsu et al.

(10) Patent No.: US 8,306,743 B2
(45) Date of Patent: Nov. 6, 2012

(54) ROUTE GUIDING APPARATUS

(75) Inventors: Naomiki Komatsu, Tokyo (JP); Takashi Irie, Tokyo (JP); Yoshiki Akashi, Tokyo (JP); Kumi Nishibashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 537 days.

(21) Appl. No.: 12/531,273

(22) PCT Filed: Jan. 10, 2008

(86) PCT No.: PCT/JP2008/050201
§ 371 (c)(1),
(2), (4) Date: Sep. 14, 2009

(87) PCT Pub. No.: WO2008/126424
PCT Pub. Date: Oct. 23, 2008

(65) Prior Publication Data
US 2010/0100311 A1  Apr. 22, 2010

(30) Foreign Application Priority Data
Apr. 5, 2007  (JP) .................... 2007-099597

(51) Int. Cl.
*G08G 1/123* (2006.01)
(52) U.S. Cl. ..... 701/437; 701/428; 701/416; 340/995.2; 340/995.19
(58) Field of Classification Search .......... 701/408, 701/431, 437, 428, 533, 443, 411, 416, 454, 701/467, 417; 340/990, 995.2, 995.19, 988, 340/996
See application file for complete search history.

(56) References Cited

U.S. PATENT DOCUMENTS
5,410,486 A * 4/1995 Kishi et al. .................. 701/437
2007/0259634 A1 * 11/2007 MacLeod et al. .......... 455/186.1

FOREIGN PATENT DOCUMENTS
| DE | 695 27 121 T2 | 10/2002 |
| JP | 6-52493 A | 2/1994 |
| JP | 7-49243 A | 2/1995 |
| JP | 2006-177721 A | 7/2006 |

* cited by examiner

*Primary Examiner* — Thomas Black
*Assistant Examiner* — Luke Huynh
(74) *Attorney, Agent, or Firm* — Birch, Stewart, Kolasch & Birch, LLC

(57) ABSTRACT

A route guiding apparatus includes a subtraction distance calculating unit 18 for calculating a distance from an entrance of a guidance intersection determined by a route guidance unit 16 to a center of the guidance intersection according to the width of a road going out of the guidance intersection in a direction along a route to define the distance as a subtraction distance, a notification distance calculating unit 19 for subtracting the subtraction distance calculated by the subtraction distance calculating unit from the distance from a current position detected by a current position detecting unit 12 to the center of the guidance intersection determined by the route guidance unit to calculate a notification distance to be notified, and a display unit 20 for displaying the notification distance calculated by the notification distance calculating unit.

3 Claims, 6 Drawing Sheets

| Width of Road Connected to Intersection(W) | Urban or Rural Type | Country or State Code | Subtraction Value |
|---|---|---|---|
| W≦A [m] | Undefined | Undefined<br>Country Code A<br>Country Code B<br>Country Code C<br>. . .<br><br>State Code a<br>State Code b<br>State Code c<br>. . . | a [m]<br>b [m]<br>a [m]<br>c [m]<br><br>c [m]<br>d [m]<br>d [m] |
| | Urban Area | Undefined<br>Country Code A<br>Country Code B<br>Country Code C<br>. . .<br><br>State Code a<br>State Code b<br>State Code c<br>. . . | |
| | Rural Area | . . . | |
| A [m]<W≦B [m] | Undefined | . . . | |
| | Urban Area | . . . | |
| | Rural Area | . . . | |
| B [m]<W≦C [m] | . . . | . . . | |
| . . . | . . . | . . . | |
| X [m]≦W | . . . | . . . | |

ROUTE GUIDING APPARATUS

FIELD OF THE INVENTION

The present invention relates to a route guiding apparatus that guides a user to his or her destination. More particularly, it relates to a technology of, when providing a guidance about an intersection, notifying the distance to the intersection to a user.

BACKGROUND OF THE INVENTION

Conventionally, there has been known a route guiding apparatus that when a vehicle reaches a guidance point set at a predetermined position located before a guidance intersection during travel along a route, provides a guidance about the intersection by, for example, outputting at least one of a voice and an image showing "00 meters to the intersection", and displays the distance to the guidance intersection and, after that, reduces the displayed distance as the vehicle travels. As such a route guiding apparatus, patent reference 1 discloses a route guiding apparatus that can change a point at which the route guiding apparatus will provide a guidance showing that the vehicle approaches an intersection at which the vehicle should make a right or left turn according to the width of the intersecting road.

This route guiding apparatus includes a number-of-lanes storage unit for recording the number of lanes of each road into a map information recording unit for recording map information thereinto, and a route guidance control unit reads lane information at the same time when the route guidance control unit reads map information and detects the width of the intersecting road. A guidance position changing unit then changes the point at which the route guiding apparatus will provide a route guidance on the basis of the information about this width of the road, i.e. changes the displayed distance to the intersection concerned, and instructs an audio control unit to provide a voice guidance when the vehicle reaches the distance. According to this instruction, the audio control unit provides a route guidance via voice to notify the driver that the vehicle has been approaching the intersection.

[Patent Reference 1] JP,6-52493,A

The above-mentioned conventional route guiding apparatus that displays the distance to the guidance intersection calculates the distance displayed thereby by referring to the distance from the guidance point to the link endpoint acquired from a map database. The distance from the guidance point to the link end point is equal to the distance from the guidance point to the center of the intersection. Therefore, when the vehicle reaches the guidance intersection, in order to set the displayed distance to zero the conventional route guiding apparatus subtracts a predetermined value (e.g. 25 m or 15 m depending on the conventional route guiding apparatus) from the calculated distance uniformly to acquire the distance to be provided for the user.

A problem with the conventional route guiding apparatus is therefore that there is a case in which before the vehicle reaches a small-scale guidance intersection, the conventional route guiding apparatus sets the displayed distance to zero, whereas even after the vehicle has entered a large-scale guidance intersection, the conventional route guiding apparatus does not set the displayed distance to zero, and the user makes a mistake in the judgment of whether or not the intersection is a guidance one.

The present invention is made in order to meet the above-mentioned request, and it is therefore an object of the present invention to provide a route guiding apparatus that can present a correct distance to a guidance intersection.

DISCLOSURE OF THE INVENTION

In order to solve the above-mentioned problem, a route guiding apparatus in accordance with the present invention includes: a route searching unit for searching for a route from a place of departure to a destination; a current position detecting unit for detecting a current position; a route guidance unit for determining a guidance intersection which is located on the route searched for by the route searching unit; a subtraction distance calculating unit for calculating a distance from an entrance of the guidance intersection determined by the route guidance unit to a center of the guidance intersection according to the width of a road going out of the guidance intersection in a direction along the route to define the distance as a subtraction distance; a notification distance calculating unit for subtracting the subtraction distance calculated by the subtraction distance calculating unit from a distance from the current position detected by the current position detecting unit to the center of the guidance intersection determined by the route guidance unit to calculate a notification distance to be notified; and a display unit for displaying the notification distance calculated by the notification distance calculating unit.

The route guiding apparatus in accordance with the present invention calculates the distance from an entrance of a guidance intersection which is located on the route to the center of the guidance intersection according to the width of the road going out of the guidance intersection in a direction along the route to define the distance as the subtraction distance, acquires the notification distance by subtracting the subtraction distance from the distance from the current position to the center of the guidance intersection, and displays the notification distance. Therefore, the route guiding apparatus can present a correct distance to the guidance intersection.

BRIEF DESCRIPTION OF THE FIGURES

FIG. 5 is a diagram showing an example of a subtraction distance calculation table for use in the route guiding apparatus in accordance with Embodiment 1 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
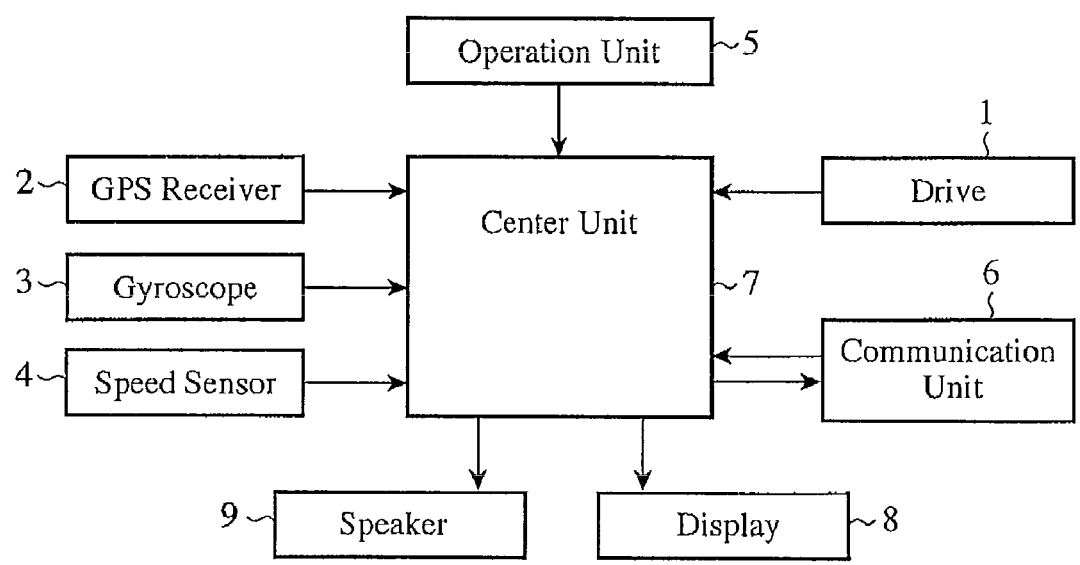
FIG. 1 is a block diagram showing the hardware configuration of a route guiding apparatus in accordance with Embodiment 1 of the present invention.

FIG. 1 is a block diagram showing the hardware configuration of a route guiding apparatus in accordance with Embodiment 1 of the present invention. This route guiding apparatus is provided with a drive 1, a GPS (Global Positioning System) receiver 2, a gyroscope 3, a speed sensor 4, an operation unit 5, a communication unit 6, a center unit 7, a display 8, and a speaker 9.

The drive 1 reads map data stored in a not-shown recording medium, and sends the map data to the center unit 7. These map data include road data and data about facilities. As the recording medium, for example, a DVD (Digital Versatile Disk) or a hard disk (Hard disk) can be used.

The GPS receiver 2 detects the absolute position and absolute direction thereof. The absolute position and absolute direction of this GPS receiver 2 which are detected by the GPS receiver 2 are informed to the center unit 7 as current position data. The gyroscope 3 detects the angular velocity of a vehicle at the time when the vehicle is making a turn. The angular velocity detected by this gyroscope 3 is informed to the center unit 7 as angular velocity data. The speed sensor 4 detects the traveling speed of the vehicle on the basis of vehicle speed pulses which are sent thereto from the vehicle every time when the vehicle has traveled a predetermined distance. The traveling speed detected by this speed sensor 4 is informed to the center unit 7 as speed data.

The operation unit 5 is comprised of a remote controller, buttons, a touch panel, or the like for receiving a user's operation. This operation unit 5 is used in order for a user to instruct the route guiding apparatus to start the display 8, switch among scales, or provide a manual voice guidance, and to input various pieces of information, such as a destination and waypoints. Information inputted through a user's operation on this operation unit 5 is sent to the center unit 7 as operation data.

The communication unit 6 controls communications carried out between this route guiding apparatus (concretely, the center unit 7) and equipment disposed outside the route guiding apparatus. For example, the communication unit transmits a request for acquisition of map data to a server (not shown) connected thereto via a network according to an instruction from the center unit 7, and sends the map data received via the network from the server, which has sent the map data to the route guiding apparatus in response to the request for acquisition, to the center unit 7 as received data.

The center unit 7 is comprised of, for example, a microcomputer, and performs various processes by using the map data sent thereto from the drive 1, the current position data sent thereto from the GPS receiver 2, the angular velocity data sent thereto from the gyroscope 3, the speed data sent thereto from the speed sensor 4, the operation data sent thereto from the operation unit 5, and the received data sent thereto from the communication unit 6 so as to control the whole of this route guiding apparatus. The details of functions implemented by this center unit 7 will be mentioned later.

The display 8 is comprised of, for example, a liquid crystal display, and displays a route guide screen including a map of an area surrounding the vehicle, an optimal route, a vehicle mark, and an intersection guide map, a point searching screen, a menu screen, and so on according to display data sent thereto from the center unit 7. The speaker 9 outputs via voice either a message which is displayed on the display 8 or a message relevant to this message according to audio data sent thereto from the center unit 7.

Figure 2:
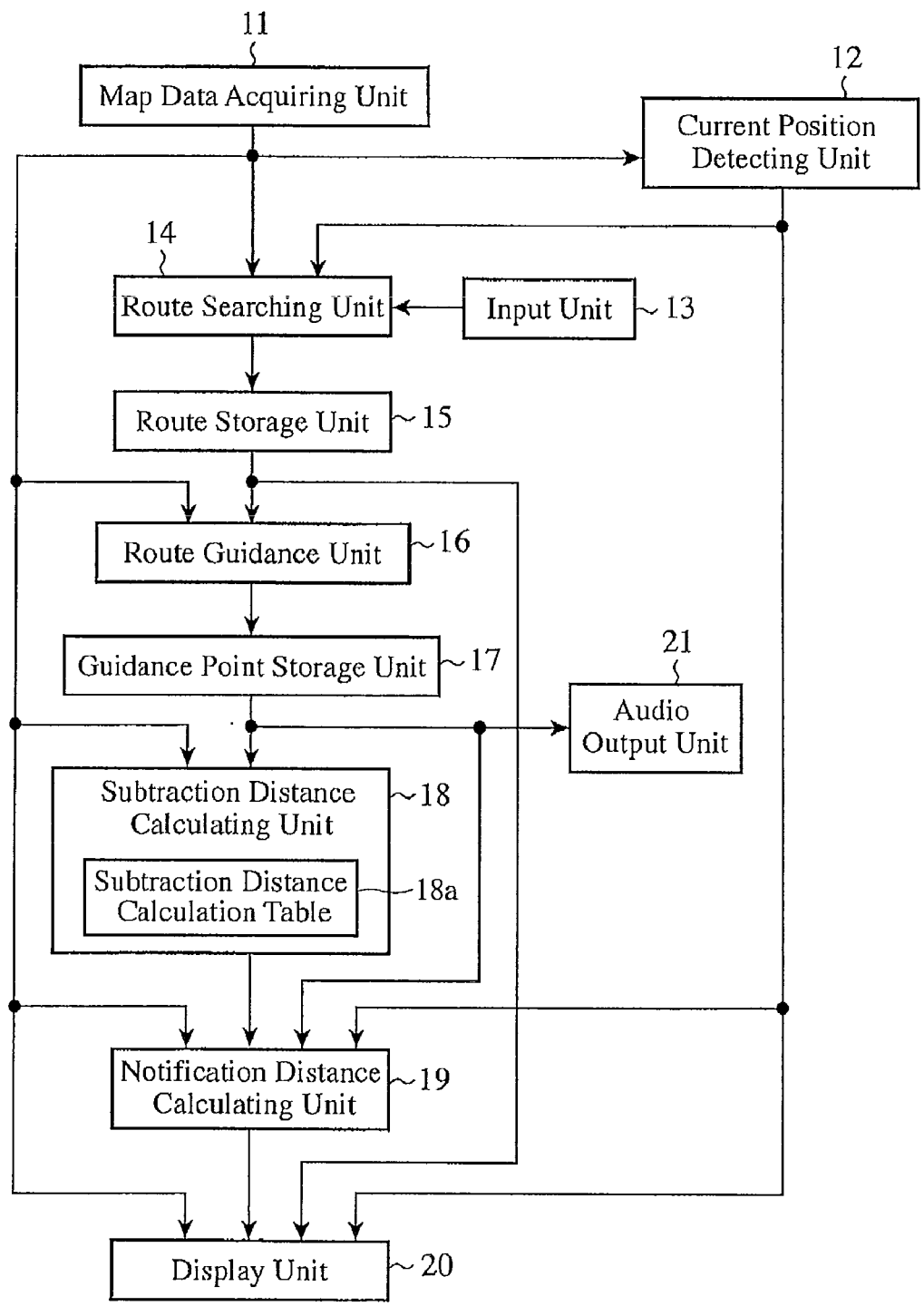
FIG. 2 is a functional block diagram showing the details of functions implemented by a center unit shown in FIG. 1.

Next, the details of the functions implemented by the center unit 7 will be explained. FIG. 2 is a block diagram showing the functional structure of the center unit V. This center unit 7 includes a map data acquiring unit 11, a current position detecting unit 12, an input unit 13, a route searching unit 14, a route storage unit 15, a route guidance unit 16, a guidance point storage unit 17, a subtraction distance calculating unit 18, a notification distance calculating unit 19, a display unit 20, and an audio output unit 21, which are implemented via software processing and an internal memory of the microcomputer.

The map data acquiring unit 11 acquires map data from either the recording medium mounted to the drive 1 or the server connected to the network via the communication unit 6. The map data acquired by this map data acquiring unit 11 are sent to the current position detecting unit 12, the route searching unit 14, the route guidance unit 16, the subtraction distance calculating unit 18, the notification distance calculating unit 19, and the display unit 20.

The current position detecting unit 12 detects a rough position of the vehicle on the basis of the current position data sent thereto from the GPS receiver 2 and/or current position data generated with autonomous navigation using the angular velocity data sent thereto from the gyroscope 3 and the speed data sent thereto from the speed sensor 4, and then detects the current position of the vehicle by performing map matching using this detected rough position and the map data acquired by the map data acquiring unit 11. This current position of the vehicle detected by the current position detecting unit 12 is informed to the route searching unit 14, the notification distance calculating unit 19, and the display unit 20 as vehicle position data.

The input unit 13 acquires the operation data for route search which are sent thereto from the operation unit 5, e.g. data about the place of departure, the waypoints, and the destination, and sends the operation data to the route searching unit 14. The route searching unit 14 searches for a route from either the current position shown by the vehicle position data sent thereto from the current position detecting unit 12 or the place of departure shown by the operation data sent thereto from the input unit 13 to the destination shown by the operation data sent thereto from the input unit 13 on the basis of the map data acquired by the map data acquiring unit 11. This route searched for by the route searching unit 14 is informed to the route storage unit 15 as route data. The route storage unit 15 stores the route data sent thereto from the route searching unit 14. These route data stored in the route storage unit 15 are read by the route guidance unit 16 and the display unit 20.

The route guidance unit 16 determines a guidance intersection which exists on the route shown by the route data read from the route storage unit 15 on the basis of the map data sent thereto from the map data acquiring unit 11. The guidance intersection determined by this route guidance unit 16 is informed to the guidance point storage unit 17 as guidance point data. The guidance point storage unit 17 stores the guidance point data sent from the route guidance unit 16. The guidance point data stored by this guidance point storage unit 17 are read by the subtraction distance calculating unit 18 and the audio output unit 21.

The subtraction distance calculating unit 18 calculates a subtraction distance by using both the guidance point data read from the guidance point storage unit 17 and the map data sent thereto from the map data acquiring unit 11. More specifically, the subtraction distance calculating unit 18 reads the guidance point data from the guidance point storage unit 17, acquires the intersection information about the guidance intersection shown by these read guidance point data from the map data, calculates the distance from the center of the intersection shown by this acquired intersection information to the entrance of the intersection, and adds a change either according to the presence or absence of a country or state code, which will be mentioned below, and according to the presence or absence of an urban or rural type, which will be mentioned below, to the calculated distance to define the addition result as the subtraction distance. This change is determined by referring to a subtraction distance calculation table as shown in FIG. 5 (which will be mentioned later in detail). This subtraction distance calculated by the subtraction distance calculating unit 18 is informed to the notification distance calculating unit 19 as subtraction distance data.

The notification distance calculating unit 19 reads the guidance point data from the guidance point storage unit 17, acquires the intersection information about the guidance intersection shown by these read guidance point data from the map data, and determines the center of the intersection shown by this acquired intersection information. The notification distance calculating unit then calculates the distance between the current position of the vehicle shown by the vehicle position data sent thereto from the current position detecting unit 12, and the center of the intersection previously determined thereby, and subtracts the subtraction distance calculated by the subtraction distance calculating unit 18 from this calculated distance to calculate a notification distance. This notification distance calculated by the notification distance calculating unit 19 is informed to the display unit 20 as notification distance data.

The display unit 20 converts a map which the center unit has generated on the basis of the map data about the area surrounding the vehicle sent thereto from the map data acquiring unit 11, a vehicle mark showing the vehicle position detected by the current position detecting unit 12, intersection guidance information which the center unit has generated on the basis of the guidance point data read from the guidance point storage unit 17, the notification distance data calculated by the notification distance calculating unit 19, and so on into display data, and then sends the display data to the display 8. As a result, the vehicle mark, the intersection guidance information, and the distance to the entrance of the guidance intersection are displayed on the map on the screen of the display 8.

The audio output unit 21 converts the guidance point data read from the guidance point storage unit 17 into audio data, and sends the audio data to the speaker 9. As a result, the intersection guidance information is outputted via voice from the speaker 9.

Figure 3:
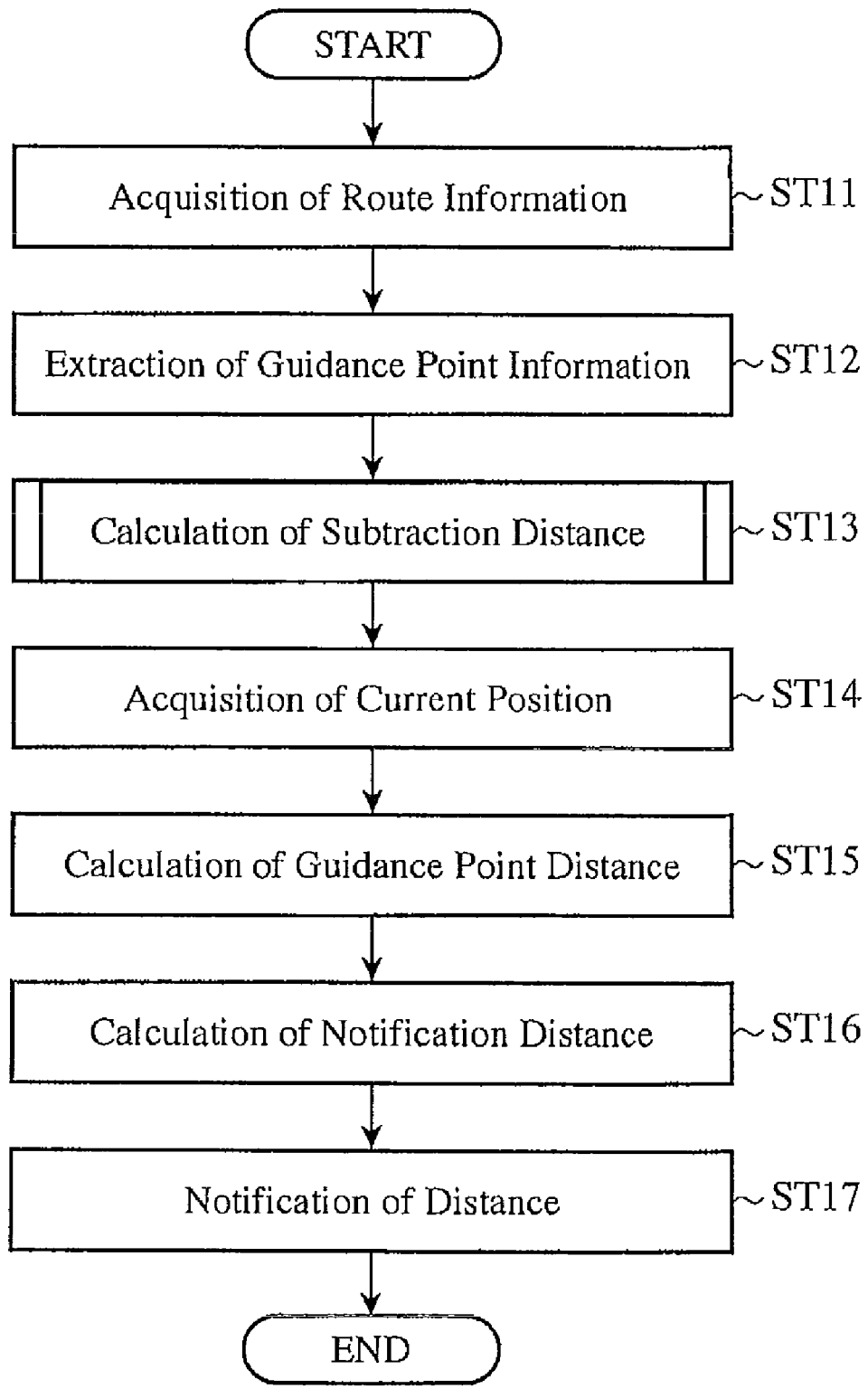
FIG. 3 is a flow chart showing the operation of the route guiding apparatus in accordance with Embodiment 1 of the present invention, focusing on distance calculation processing.

Next, the operation of the route guiding apparatus in accordance with Embodiment 1 of the present invention which is constructed as mentioned above will be explained with reference to a flow chart shown in FIG. 3, focusing on distance calculation processing. Hereafter, it is assumed that the route search by the route searching unit 14 has been completed, and the route data are stored in the route storage unit 15.

In this distance calculation processing, a route information acquisition process is performed first (step ST11). More specifically, the route guidance unit 16 acquires the route data from the route storage unit 15. A guidance point information extracting process is then performed (step ST12). More specifically, the route guidance unit 16 determines a guidance intersection which exists on the route shown by the route data, in step ST11, acquired from the route storage unit 15 on the basis of the map data sent thereto from the map data acquiring unit 11, and stores the guidance intersection in the guidance point storage unit 17 as guidance point data.

A subtraction distance calculation process is then performed (step ST13). More specifically, the subtraction distance calculating unit 18 reads the guidance point data from the guidance point storage unit 17, and acquires the intersection information about the guidance intersection shown by these read guidance point data from the map data. The subtraction distance calculating unit then calculates the distance from the center of the intersection shown by this acquired intersection information to the entrance of the intersection, and adds a change either according to the presence or absence of a country or state code, which will be mentioned below, and according to the presence or absence of an urban or rural type, which will be mentioned below, to the calculated distance to define the addition result as a subtraction distance. This calculated subtraction distance is informed to the notification distance calculating unit 19 as subtraction distance data. The subtraction distance calculation process performed in this step ST13 will be further explained below in detail.

A current position acquisition process is then performed (step ST14). More specifically, the notification distance calculating unit 19 acquires the vehicle position data from the current position detecting unit 12. A guidance point distance calculation process is then performed (step ST15). More specifically, the notification distance calculating unit 19 determines the distance between the current position of the vehicle shown by the vehicle position data sent thereto from the current position detecting unit 12, and the center of the guidance intersection shown by the guidance point data read from the guidance point storage unit 17, and defines the distance as a guidance point distance.

A notification distance calculation process is then performed (step ST16). More specifically, the notification distance calculating unit 19 calculates a notification distance by subtracting the subtraction distance calculated in step ST13 from the guidance point distance calculated in step ST15, and informs the notification distance to the display unit 20 as notification distance data.

A distance notification process is then performed (step ST17). More specifically, the notification distance calculating unit 19 sends the notification distance data calculated in step ST16 to the display unit 20. The display unit 20 converts the notification distance data sent thereto from the notification distance calculating unit 19 into display data, and sends the display data to the display 8. As a result, the distance to the entrance of the next guidance intersection is displayed, as a remaining distance, in, for example, a remaining distance display area 61 formed on the screen of the display 8 in the form of a bar graph. The remaining distance which is displayed in the remaining distance display area 61 can be alternatively expressed as a numerical value.

Figure 4:
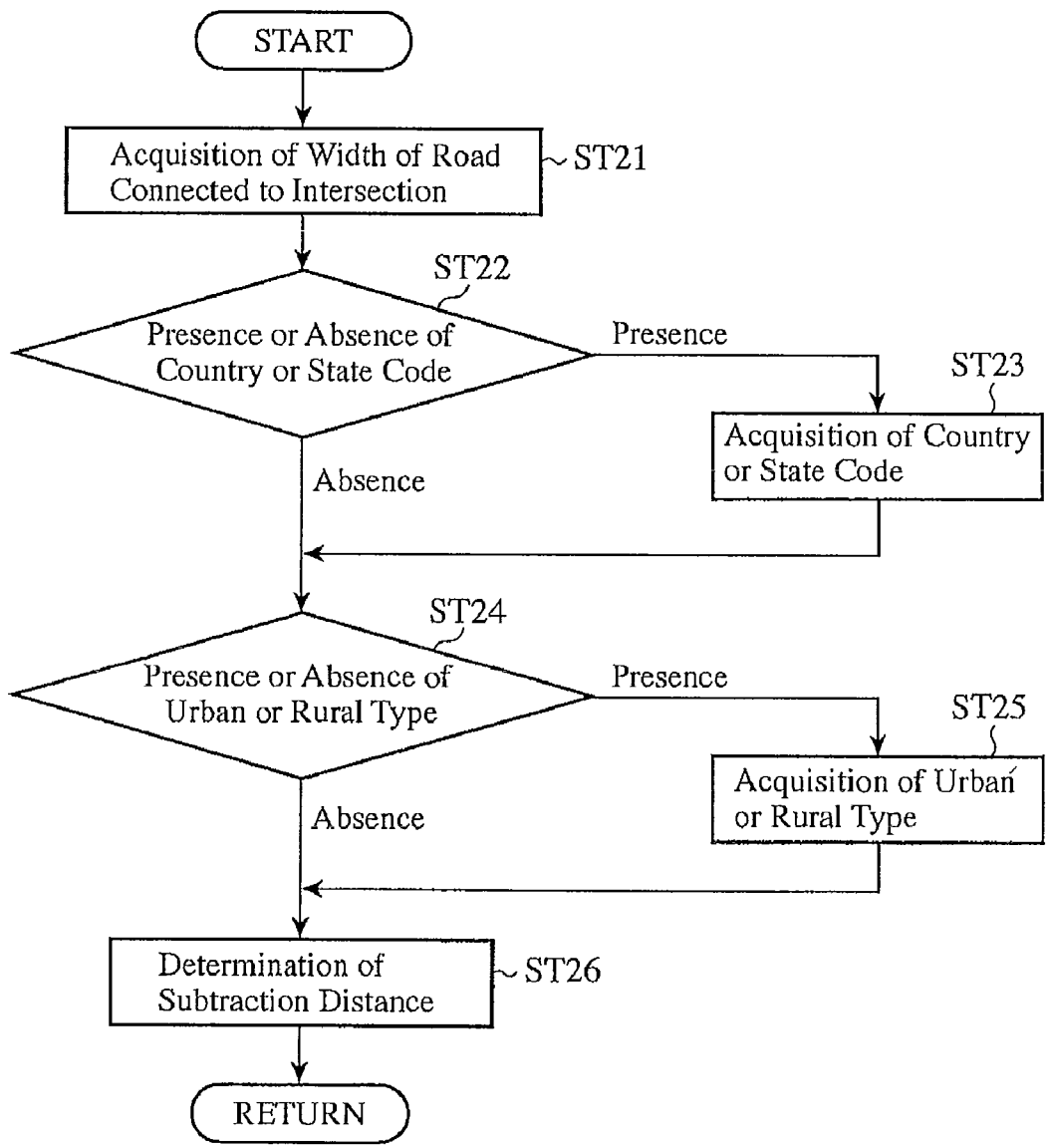
FIG. 4 is a flow chart showing the details of a subtraction distance calculation process shown in FIG. 3.
Figure 6:
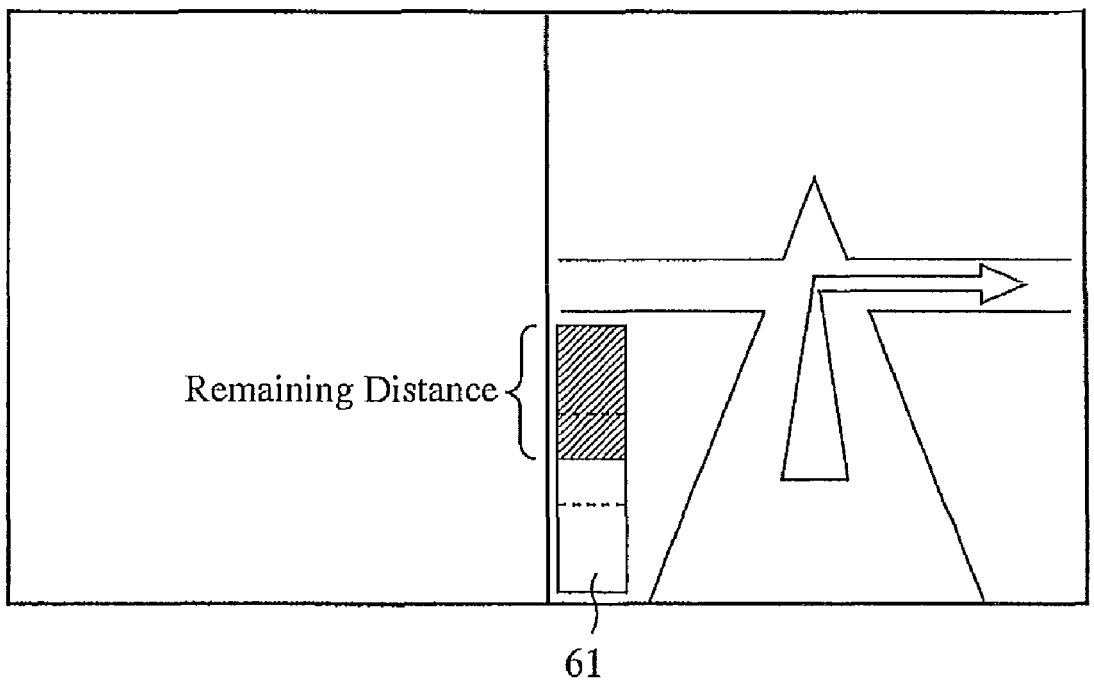
FIG. 6 is a diagram showing an example of display of a distance by the route guiding apparatus in accordance with Embodiment 1 of the present invention.

Next, the details of the subtraction distance calculation process performed in above-mentioned step ST13 will be explained with reference to a flow chart shown in FIG. 4.

In the subtraction distance calculation process, the width of each of all the roads connected to the intersection is acquired first (step ST21). More specifically, the subtraction distance calculating unit 18 reads the guidance point data from the guidance point storage unit 17, and acquires the intersection information about the guidance intersection shown by these read guidance point data from the map data. The subtraction distance calculating unit then acquires the width of each of all the roads connected to the intersection shown by this acquired intersection information.

The presence or absence of a country or state code is then checked to see (step ST22). More specifically, the subtraction distance calculating unit 18 checks to see whether or not a country or state code is included in the map data acquired in step ST21. When, in this step ST22, judging that neither a country code nor a state code is included in the map data, the subtraction distance calculating unit advances the sequence to step ST24. In contrast, when, in step ST22, judging that a country or state code is included in the map data, the subtraction distance calculating unit acquires the country or state code (step ST23). More specifically, the subtraction distance calculating unit 18 acquires a country or state code from the map data acquiring unit 11. After that, the subtraction distance calculating unit advances the sequence to step ST24.

In step ST24, the presence or absence of an urban or rural type is checked to see (step ST24). More specifically, the subtraction distance calculating unit 18 checks to see whether or not information indicating an urban or rural type is included in the map data acquired in step ST21. When, in this step ST24, judging that any urban or rural type is not included in the map data, the subtraction distance calculating unit advances the sequence to step ST26. In contrast, when, in step ST24, judging that an urban or rural type is included in the map data, the subtraction distance calculating unit acquires the information indicating an urban or rural type (step ST25). More specifically, the subtraction distance calculating unit 18 acquires the information indicating an urban or rural type from the map data acquiring unit 11. After that, the subtraction distance calculating unit advances the sequence to step ST26.

A subtraction distance determination process is performed in step ST26. In this subtraction distance determination process, the subtraction distance calculation table 18*a* as shown in FIG. 5 is referred to. The subtraction distance calculation table 18*a* stores a subtraction value, which is provided for each of urban or rural types and for each of country and state codes, for each and every class of the road width W of a road connected to an intersection.

In the subtraction distance determination process, the subtraction distance calculating unit 18 selects one class corresponding to the road width W of the road going out of the intersection in the direction along the route when the vehicle travels along the route, among the road widths W of all the roads acquired in step ST21, from the subtraction distance calculation table 18*a*, and further narrows this selected class to one of the urban or rural types: "no setting", "urban area" and "rural area" according to the processes of steps ST24 and ST25. Furthermore, the subtraction distance calculating unit narrows the one of the three urban or rural area settings to one of plural settings of country or state code: "no setting", "country codes A, B, C, . . . " and "state codes a, b, c, . . . " according to the processes of steps ST22 and ST23, and acquires the subtraction value corresponding to "no setting", "country code", or "state code" which the subtraction distance calculating unit has finally selected. The subtraction distance calculating unit 18 then reads the guidance point data from the guidance point storage unit 17, acquires the intersection information about the guidance intersection shown by this read guidance point data from the map data, calculates the distance from the center of the intersection shown by this acquired intersection information to the entrance of the intersection, and subtracts the above-mentioned subtraction value from this calculated distance to calculate a subtraction distance. After that, the subtraction distance calculating unit returns the sequence to step ST14 of the distance calculation processing shown in the flow chart of FIG. 3.

The above-mentioned subtraction distance calculation processing provides the following advantages. More specifically, because, for example, whether or not a side strip, such as a bikeway, is added to a road depending upon the country or state in which the road exists and whether the road is located in an urban or rural area, presentation of only a remaining distance determined from the road width of the road from which the width of the side strip is subtracted raises the possibility that the user makes a mistake in the judgment of whether or not the intersection is a guidance one. In contrast, because the route guiding apparatus in accordance with this embodiment makes the subtraction distance variable according to whether or not a country or state code is included and whether or not an urban or rural type is included, the route guiding apparatus can present a correct remaining distance to the intersection for the user even though the road is located in any country or state and in either of urban and rural areas.

As previously explained, the route guiding apparatus in accordance with Embodiment 1 of the present invention calculates the distance from an entrance of a guidance intersection which is located on a route to the center of the guidance intersection according to the width of the road going out of the guidance intersection in the direction along the route to define the distance as the subtraction distance, acquires the notification distance by subtracting the subtraction distance from the distance from the current position to the center of the guidance intersection, and displays the notification distance. Therefore, the route guiding apparatus in accordance with Embodiment 1 of the present invention can present a correct distance to the guidance intersection.

INDUSTRIAL APPLICABILITY

As mentioned above, because the route guiding apparatus in accordance with the present invention can present a correct distance to a guidance intersection by subtracting the distance from the entrance of the intersection to the center of the intersection according to the width of a road at the guidance intersection, the route guiding apparatus in accordance with the present invention is suitable for use in a vehicle-mounted navigation apparatus that provides an intersection guidance, and so on.

The invention claimed is:

1. A route guiding apparatus comprising:
a route searching unit for searching for a route from a place of departure to a destination;
a current position detecting unit for detecting a current position;
a route guidance unit for determining a guidance intersection which is located on the route searched for by said route searching unit;
a subtraction distance calculating unit for calculating a distance from an entrance of the guidance intersection determined by said route guidance unit to a center of the guidance intersection according to a width of a road going out of the guidance intersection in a direction along the route and adding a change to the calculated distance based on a country or state code of the road or based on the type of road where the guidance intersection exits to define the distance as a subtraction distance;
a notification distance calculating unit for subtracting the subtraction distance calculated by said subtraction distance calculating unit from a distance from the current position detected by said current position detecting unit to the center of the guidance intersection determined by said route guidance unit to calculate a notification distance to be notified; and
a display unit for displaying the notification distance calculated by said notification distance calculating unit.

2. The route guiding apparatus according to claim 1, wherein the subtraction distance calculating unit detects a country or state where the guidance intersection determined by the route guidance unit exists, determines the width of the road going out of the guidance intersection in the direction along the route according to said detected country or state, and calculates the distance from the entrance of said guidance intersection to the center of said guidance intersection according to said determined road width to define the distance as the subtraction distance.

3. The route guiding apparatus according to claim 1, wherein the subtraction distance calculating unit detects an urban or rural type of an area where the guidance intersection determined by the route guidance unit exists, determines the width of the road going out of the guidance intersection in the direction along the route according to said detected urban or rural type, and calculates the distance from the entrance of said guidance intersection to the center of said guidance intersection according to said determined road width to define the distance as the subtraction distance.

\* \* \* \* \*